United States Patent
Greene

(10) Patent No.: US 8,733,527 B2
(45) Date of Patent: May 27, 2014

(54) BALL RAMP CLUTCH

(75) Inventor: Darrell F. Greene, Bradford (CA)

(73) Assignee: Magna Powertrain Inc., Concord, Ontario (CA)

( * ) Notice: Subject to any disclaimer, the term of this patent is extended or adjusted under 35 U.S.C. 154(b) by 12 days.

(21) Appl. No.: 13/379,097

(22) PCT Filed: Jun. 21, 2010

(86) PCT No.: PCT/CA2010/000978
§ 371 (c)(1),
(2), (4) Date: Dec. 19, 2011

(87) PCT Pub. No.: WO2010/148507
PCT Pub. Date: Dec. 29, 2010

(65) Prior Publication Data
US 2012/0097496 A1    Apr. 26, 2012

Related U.S. Application Data

(60) Provisional application No. 61/219,472, filed on Jun. 23, 2009.

(51) Int. Cl.
*F16D 13/04* (2006.01)
*F16D 13/42* (2006.01)

(52) U.S. Cl.
USPC .......................... 192/90; 192/84.7; 192/93 A

(58) Field of Classification Search
USPC ........................................... 192/45.015, 84.7
See application file for complete search history.

(56) References Cited

U.S. PATENT DOCUMENTS

| | | | |
|---|---|---|---|
| 2,820,440 A | 1/1958 | Jacobs | |
| 4,187,938 A * | 2/1980 | Miller | 192/54.4 |
| 4,280,073 A | 7/1981 | Miller | |
| 5,651,437 A * | 7/1997 | Organek et al. | 192/35 |
| 5,943,911 A * | 8/1999 | Beckerman | 74/333 |
| 6,158,561 A * | 12/2000 | Sakai et al. | 192/35 |
| 7,874,413 B2 * | 1/2011 | Saito et al. | 192/35 |
| 2003/0089185 A1 | 5/2003 | Hock et al. | |
| 2003/0209399 A1 | 11/2003 | Organek et al. | |
| 2004/0050643 A1 * | 3/2004 | Krzesicki et al. | 192/70.23 |
| 2004/0112702 A1 | 6/2004 | Stevenson | |
| 2005/0167231 A1 * | 8/2005 | Kurmaniak | 192/84.7 |
| 2005/0178635 A1 * | 8/2005 | Schultheiss et al. | 192/57 |

FOREIGN PATENT DOCUMENTS

| | | |
|---|---|---|
| EP | 0669480 A1 | 8/1995 |
| EP | 0905399 A1 | 3/1999 |

OTHER PUBLICATIONS

International Search Report mailed Nov. 11, 2013.

* cited by examiner

*Primary Examiner* — David D Le
*Assistant Examiner* — Mark Manley
(74) *Attorney, Agent, or Firm* — Dickinson Wright, PLLC

(57) ABSTRACT

An electromagnetic clutch includes a rotatable input member and a rotatable output member. A clutch plate is fixed for rotation with one of the input member and the output member. An armature plate is axially moveable relative to the other of the input member and the output member. A self-energizing actuator converts rotary motion of the input member to linear movement of the armature plate. The actuator includes a biasing member urging relative rotation between the one of the input member and the output member and the armature plate to initially engage the armature plate and the clutch plate. The self-energizing actuator provides an additional clutch engagement force once the input member is driven and also includes an electromagnet to axially translate the armature plate and disengage the armature plate and the clutch plate.

25 Claims, 15 Drawing Sheets

BALL RAMP CLUTCH

CROSS-REFERENCE TO RELATED APPLICATIONS

This application claims the benefit of U.S. Provisional Application No. 61/219,472, filed on Jun. 23, 2009. The entire disclosure of the above application is incorporated herein by reference.

FIELD

The present disclosure relates to a clutch and a clutch actuator. More particularly, a clutch actuator includes a dual input force mechanism including a biasing member and an incline plane such that torque transferred by the clutch provides a majority of the clutch actuation input force. The clutch is deactuated by an electro-magnet.

BACKGROUND

Electromagnetic clutches have been utilized commercially in a variety of applications, including automobiles. Typically, an electromagnetic clutch includes a rotor having an inner annular bearing portion, a clutch portion extending generally radially outwardly from one end of the inner portion and an outer annular portion extending from the clutch portion in a generally overlying spaced relation with respect to the inner portion. The spacing between the inner and outer annular portions receives an electromagnetic coil that may be energized to create a flux field in the rotor. A floating plate mounted to the annular portion may be attracted by the magnetic field for selective coupling to the rotor when the electromagnetic coil is energized.

Another friction clutch has been configured as a normally closed clutch having a number of springs biasedly urging a floating plate into engagement with a friction plate. The entire clutch actuation force is provided by the springs. To disengage the clutch and cease torque transfer from the friction plate to the floating plate, an electromagnet is energized to overcome the force of the biasing springs and translate the floating plate away from the friction plate. While these prior electromagnetic clutches may have served a purpose, a need for improvement exists. In particular, to disengage the floating plate from the friction plate, a relatively large quantity of energy is required to overcome the biasing force of the springs. Accordingly, it may be desirable to provide an energy efficient electro-magnetic clutch.

SUMMARY

This section provides a general summary of the disclosure, and is not a comprehensive disclosure of its full scope or all of its features.

An electromagnetic clutch includes a rotatable input member and a rotatable output member. A clutch plate is fixed for rotation with one of the input member and the output member. An armature plate is axially moveable relative to the other of the input member and the output member. A self-energizing actuator converts rotary motion of the input member to linear movement of the armature plate. The actuator includes a biasing member urging relative rotation between the one of the input member and the output member and the armature plate to initially engage the armature plate and the clutch plate. The self-energizing actuator provides an additional clutch engagement force once the input member is driven and also includes an electromagnet to axially translate the armature plate and disengage the armature plate and the clutch plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
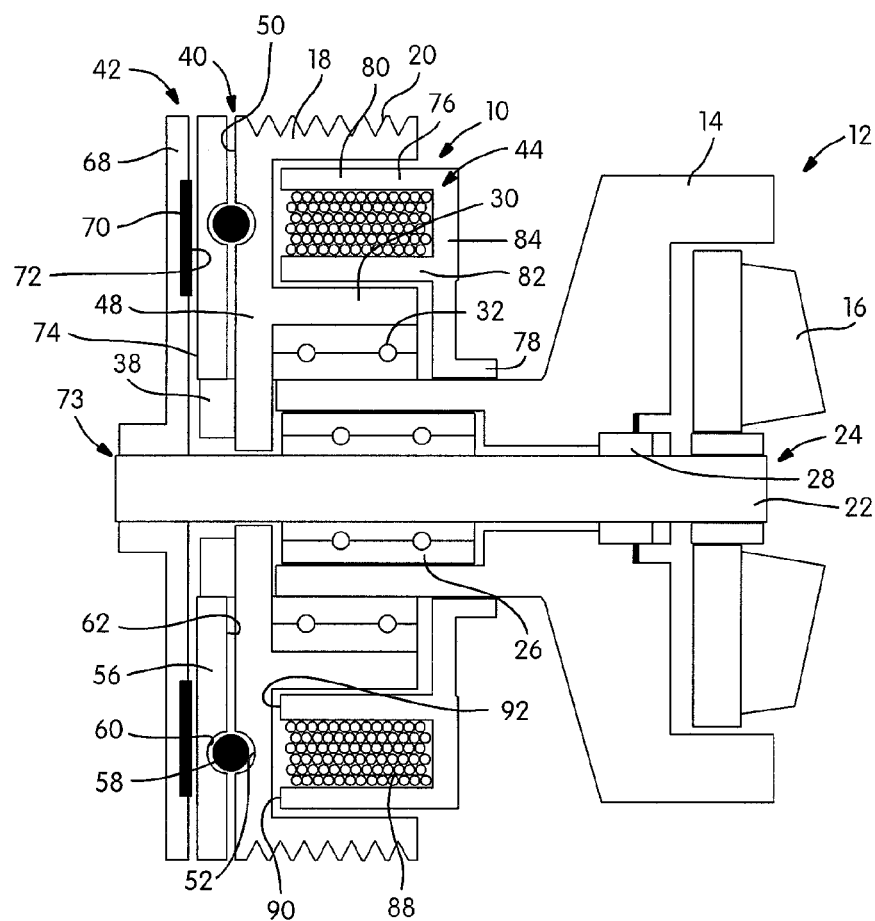
FIG. 1 is a cross-sectional view of an electromagnetic clutch associated with an exemplary water pump.

FIG. 1 provides a cross-sectional view of an electromagnetic clutch 10 associated with an exemplary water pump 12. Water pump 12 includes a housing 14 and a rotatable impeller 16. It should be appreciated that water pump 12 is merely an exemplary driven load and any number of other automobile accessories or subsystems may be in receipt of power transferred through clutch 10. A rotatable input shaft 18 provides torque input to clutch 10 and includes a driven pulley 20 in the example depicted in FIG. 1. Input power may be transferred to clutch 10 via any number of other mechanical elements including sprockets, gears, chains, belts or the like. Pulley 20 is configured to be driven by a flexible belt coupled to an output shaft of an internal combustion engine (not shown). A rotatable output shaft 22 includes an end 24 fixed for rotation with impeller 16. Output shaft 22 is supported for rotation within housing 14 by a bearing assembly 26. A shaft seal 28 may be used in a water pump environment as shown. Input shaft 18 includes a hub portion 30 supported for rotation on housing 14 by a bearing assembly 32.

Clutch 10 is operable to transfer torque between input shaft 18 and output shaft 22 and includes a biasing member 38, a ball ramp mechanism 40, a friction plate assembly 42 and an electromagnet 44. Input shaft 18 includes a plate portion 48 having a substantially planar surface 50. A plurality of first grooves 52 are circumferentially spaced apart from one another and formed on surface 50 to define a first cam plate of ball ramp mechanism 40. Each groove 52 is arc shaped and has a varying depth.

Ball ramp mechanism 40 also includes an armature plate 56 and a plurality of balls 58. A second set of grooves 60 are formed on a substantially planar surface 62 of armature plate 56 to define a second cam plate. Second grooves 60 are circumferentially spaced apart from one another and positioned to oppose and cooperate with first grooves 52. Each of second grooves 60 is also tapered having a varying depth in a circumferential direction. Each ball 58 is positioned within a corresponding pair of first grooves 52 and second grooves 60.

Biasing member 38 interconnects armature plate 56 and input shaft 18. Biasing member 38 may be formed as a torsional spring, a compression spring, an elastomeric block or another member that allows a limited relative rotation between armature plate 56 and input shaft 18 in opposition to a torque applied by biasing member 38. More particularly, biasing member 38 applies a torque to urge balls 58 from the deepest portions of the grooves toward shallow ends of the grooves. Biasing member 38 is sized to apply a relatively low torque. Based on the ball ramp angle of the first and second grooves 52, 60 and the radius at which the balls are located, a relatively low axial force is generated to axially translate armature plate 56 toward a driven plate 68 of friction plate assembly 42. It is contemplated that an axial apply force of less than 100 N is provided through the combination of biasing member 38 and ball ramp mechanism 40.

A friction material 70 is fixed to driven plate 68 and includes a friction surface 72. Driven plate 68 is fixed to an end 73 of output shaft 22. A clutch surface 74 is formed on armature plate 56 and extends substantially parallel to and opposite friction clutch surface 72.

Electromagnet 44 includes a housing 76 having a collar 78 fixed to housing 14. Housing 76 includes cup-shaped portion having an outer cylindrical wall 80 and an inner cylindrical wall 82 interconnected by an end wall 84. A wire coil 88 is positioned within the cup portion of housing 76. Wire 88 and housing 76 form electromagnet 44 such that when current passes through wire 88 a flux field will be formed. During electromagnet energization, a first pole 90 is formed on an end face of outer cylindrical wall 80. An opposite pole 92 is formed on an end face of inner cylindrical wall 82. A flux field is transmitted via face 50 to act on armature plate 56 to axially move the armature plate out of engagement with friction surface 72. At this time, torque is not transferred by clutch 10.

In operation, torque transfer through clutch 10 is initiated by deenergizing electromagnet 44. Biasing member 38 induces relative rotation between armature plate 56 and input shaft 18 to cause ball ramp mechanism 40 to axially translate armature plate 56 away from plate portion 48 of input shaft 18. Friction surface 74 is placed in biased engagement with clutch surface 74. Due to the relatively low load provided by biasing member 38, the torque transferrable through clutch 10 at this time is very low. Once some torque is transferred through friction plate assembly, however, clutch surface 74 is driven into engagement with friction surface 72. Clutch 10 self-energizes due to the presence of a resistance load from impeller 16. Impeller 16 is positioned within a fluid to be pumped and the resistance to rotation is transferred through output shaft 22 and driven plate 68. Due to the frictional interface at friction plate assembly 42, armature plate 56 resists rotation. Drive torque provided by input shaft 18 causes additional relative rotation between first grooves 52 and second grooves 60. Balls 58 are urged toward the shallow ends of the grooves and the force transferred through ball ramp mechanism 40 increases due to the ramp angle of the grooves. The force transferred from armature plate 56 to driven plate 68 increases significantly. As the normal force increases at the interface between friction surface 72 and clutch surface 74, the maximum torque transferrable by clutch 10 also increases.

To disengage clutch 10, electromagnet 44 is energized to draw armature plate 56 out of engagement with friction surface 72. When torque is not being transmitted by clutch 10, the force required to translate armature plate 56 will be substantially lower than conventionally required due to biasing member 38 having a relatively small contribution toward the clutch apply force and the self-energizing effect of ball ramp mechanism 40 providing the majority of the apply force supplied to friction plate assembly 42. When clutch 10 is energized, electromagnet 44 will function to cease torque transmission when the linear force provided by the electromagnet is greater than the linear force developed by the action of the ball ramps. Otherwise, electromagnet 44 will be unable to disengage armature plate 56 from friction surface 72. It should be appreciated that clutch 10 may be designed to allow disengagement at or near only zero RPM such that the electromagnet 44 is sized as small as possible to draw a minimal amount of power. Alternatively, electromagnet 44 may be designed for higher speed clutch disengagement. The size and power draw of the electromagnet would be defined to provide enough force to overcome both the load provided by biasing member 38 and the self-energization load provided during torque transfer.

Figure 2:
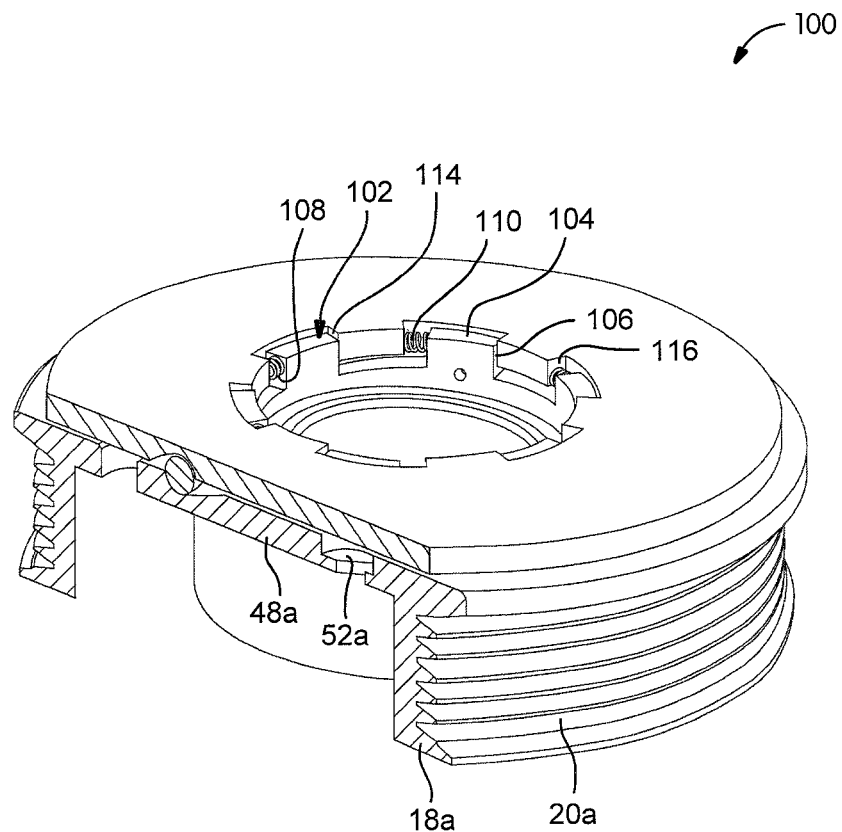
FIG. 2 is a fragmentary perspective view of a portion of another electromagnetic clutch.
Figure 3:
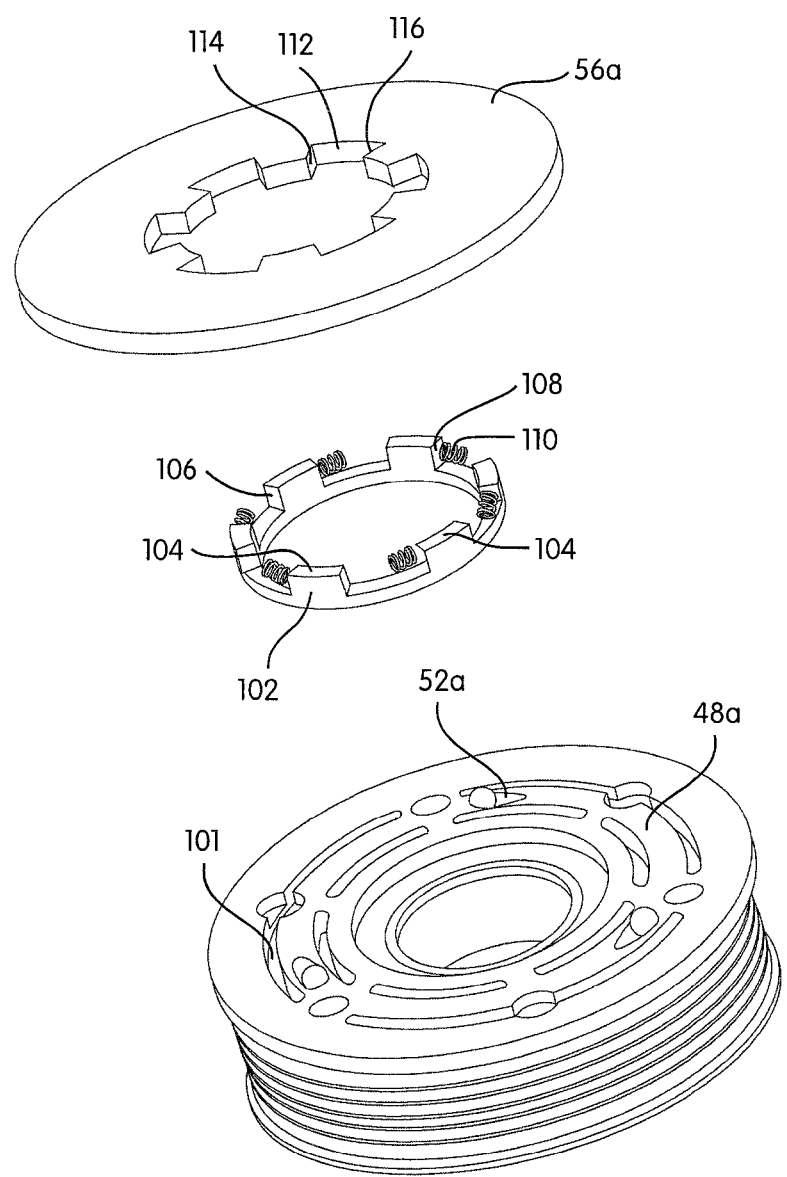
FIG. 3 is an exploded perspective view of a portion of the electromagnetic clutch depicted in FIG. 2.

FIGS. 2 and 3 depict portions of another electromagnetic clutch 100. Electromagnetic clutch 100 is substantially similar to electromagnetic clutch 10. As such, similar elements will be identified with like reference numerals including an "a" suffix. Clutch 100 includes an input shaft 18a including a driven pulley portion 20a. A plate portion 48a of input shaft 18a includes a plurality of first grooves 52a. A plurality of banana slots 101 extend through plate portion 48a to allow the magnetic flux created by electromagnet 44a to pass therethrough and act on armature plate 56a. A retainer 102 is substantially cylindrically shaped and includes a plurality of circumferentially spaced apart castellations 104. Each castellation 104 includes a first side wall 106 and a second side wall 108. A plurality of springs 110 are positioned within the gaps formed between each castellation 104. More particularly, each spring 110 engages one of second side walls 108. Retainer 102 is fixed for rotation with plate portion 48a. Retainer 102 may be fixed to input shaft 18a via any number of techniques including welding, adhesive bonding, mechanical fastening, or the like. Alternatively, retainer 102 may be integrally formed with pulley 20a and the other portions of input shaft 18a as a monolithic, one-piece member.

Armature plate 56a includes a plurality of slots 112. Each slot is at least partially defined by a first side face 114 and a second side face 116. Once clutch 100 is assembled, each spring 110 is trapped between one of second side walls 108 and one of second side faces 116. First side wall 106 of retainer 102 is urged toward first side face 114. Based on the relative positioning of armature plate 56a, springs 110 and retainer 102, armature plate 56a is urged to rotate relative input shaft 18a in a direction to cause axial translation of armature plate 56a into engagement with an output member such as driven plate 68 (FIG. 1).

Figure 4:
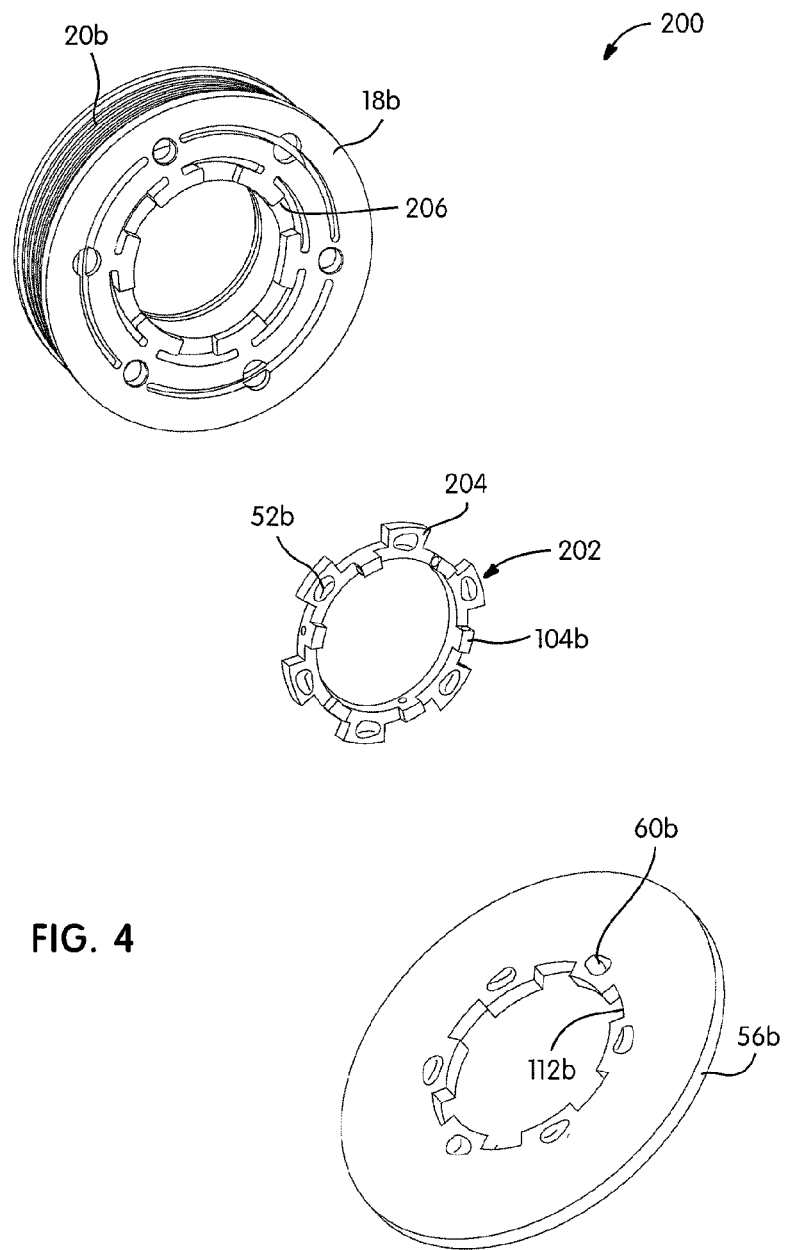
FIG. 4 is an exploded perspective view of a portion of another electromagnetic clutch.
Figure 5:
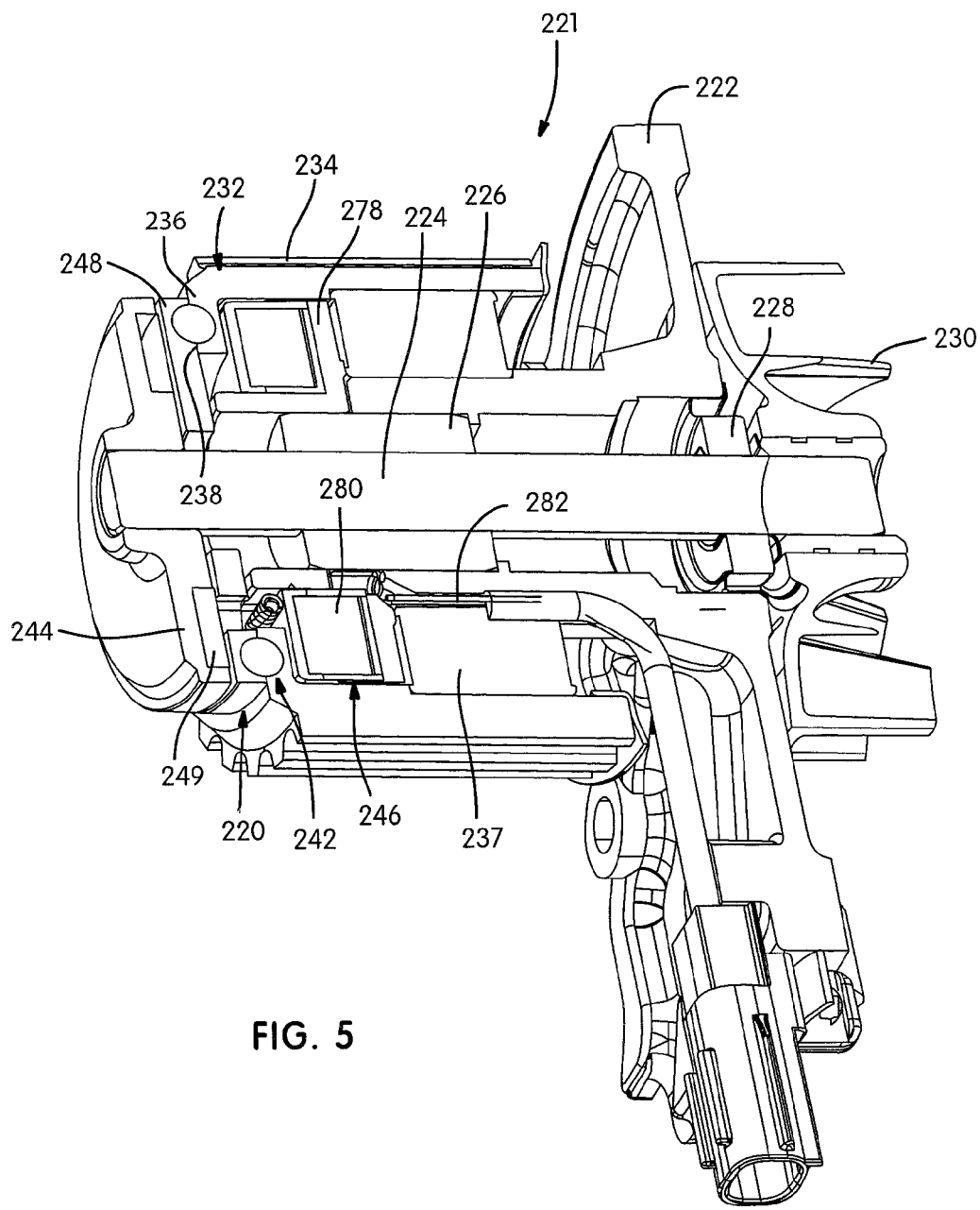
FIG. 5 is a cross-sectional perspective view of another electromagnetic clutch associated with another exemplary water pump.
Figure 6:
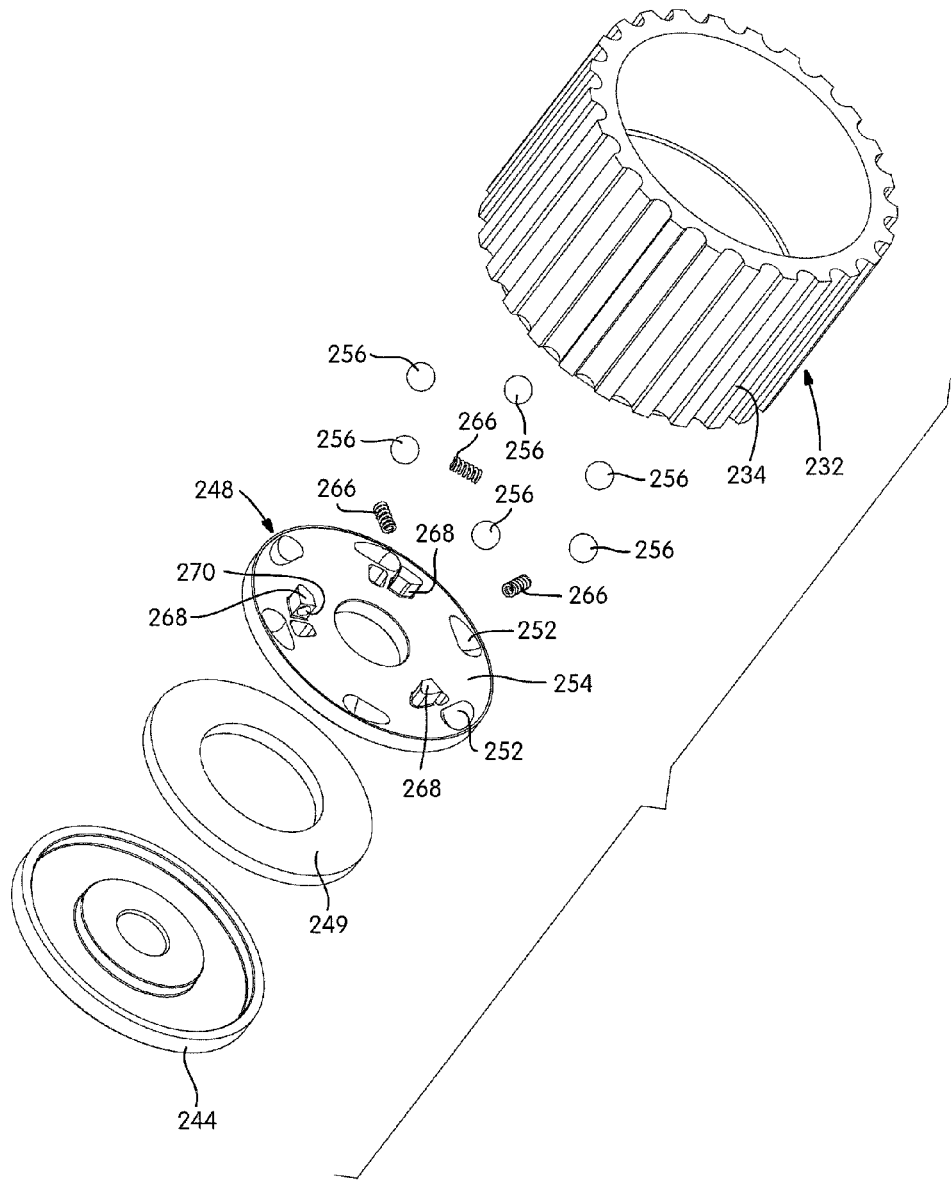
FIG. 6 is a fragmentary exploded perspective view of a portion of the clutch depicted in FIG. 5.
Figure 7:
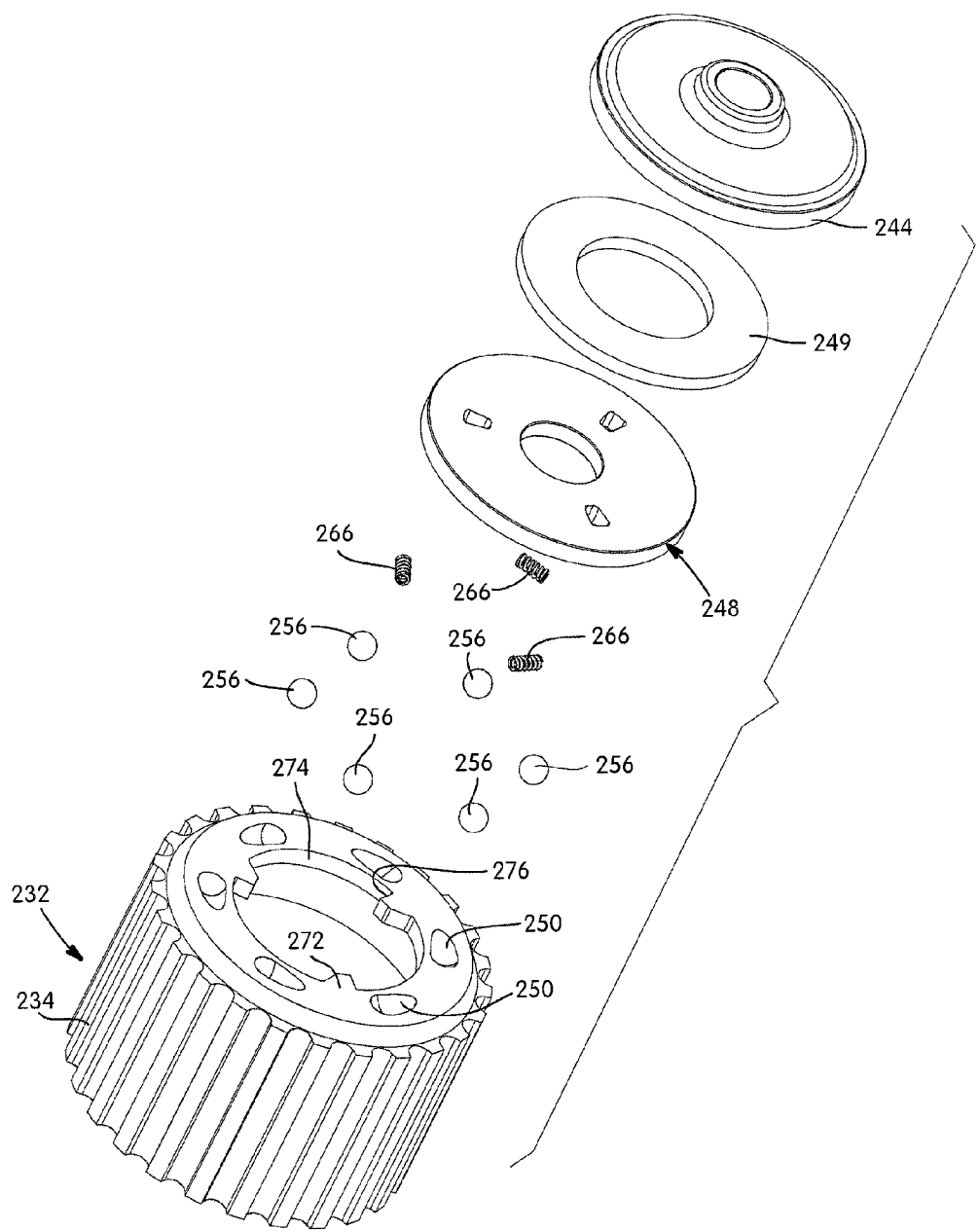
FIG. 7 is another fragmentary exploded perspective view of a portion of the clutch depicted in FIG. 5.
Figure 8:
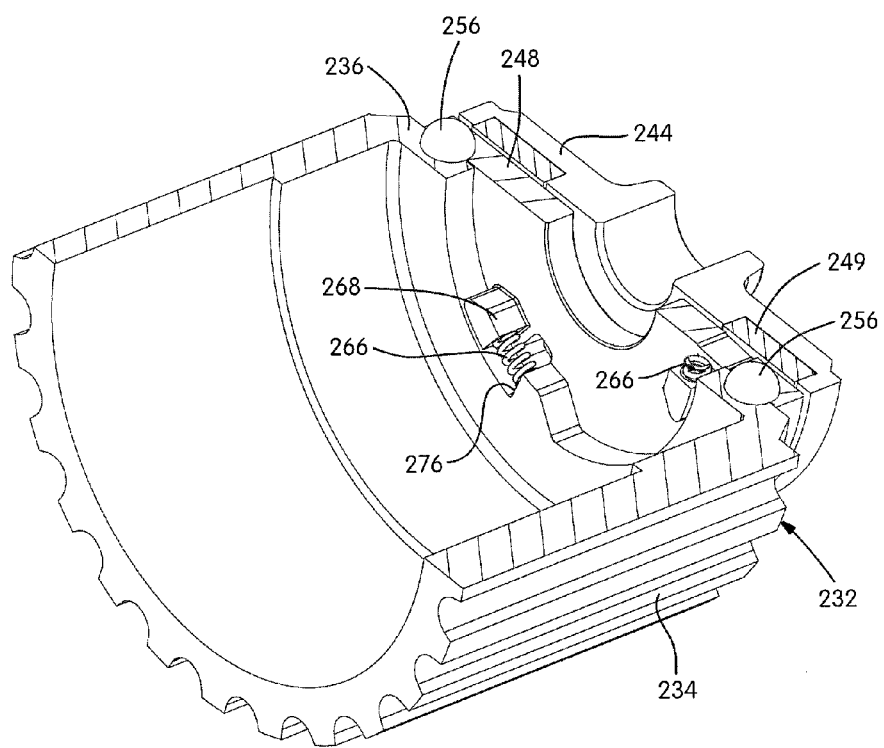
FIG. 8 is a fragmentary perspective view of a portion of the clutch depicted in FIG. 5.

FIG. 4 depicts another electromagnetic clutch identified at reference numeral 200. Clutch 200 is substantially similar to clutch 100. Accordingly, similar elements will be identified with like reference numerals including a "b" suffix. Clutch 200 differs from clutch 100 in that a retainer 202 includes not only castellations 104b but also radially extending protrusions 204. Each radially extending protrusion 204 includes one of first grooves 52b. Input shaft 18b includes a plurality of keys 206 circumferentially spaced apart from one another and sized to receive radially extending protrusions 204. At assembly, retainer 202 is fixed for rotation with input shaft 18b. This arrangement allows retainer 202 to be constructed from a different material than pulley 20b and input shaft 18b. It is contemplated that retainer 202 is formed from steel and at least first grooves 52b are hardened. Armature plate 56b includes slots 112b in receipt of castellations 104b and springs 110b to function similarly to clutch 100. Armature plate 56b may be formed from a hardenable material where at least second grooves 60b are hardened.

FIGS. 5-10 depict another electromagnetic clutch identified at reference numeral 220. Clutch 220 is similar to clutch 100 and clutch 200 but includes a number of different features to provide long-term, robust operation.

Clutch 220 forms part of a pump assembly 221 including a housing 222 rotatably supporting an output shaft 224 with a bearing 226. A seal assembly 228 is positioned between housing 222 and output shaft 224 to restrict ingress of contaminants. An impeller 230 is fixed for rotation with output shaft 224. An input shaft 232 includes a sprocket 234 integrally formed with a hub 236. A bearing 237 supports input shaft 232 for rotation relative to housing 222.

Clutch 220 is operable to selectively transfer torque between input shaft 232 and output shaft 224. Clutch 220 includes a ball ramp mechanism 242, a driven plate 244 and an electromagnet 246. Ball ramp mechanism 242 includes an armature plate 248 axially moveable between a position of engagement and a position of disengagement with a friction pad 249 fixed for rotation with driven plate 244. A plurality of first grooves 250 are circumferentially spaced apart from one another and formed on a substantially planar surface 238 of hub 236 to define a first cam plate of ball ramp mechanism 242. A second set of grooves 252 are formed on a substantially planar surface 254 of armature plate 248 to define a second cam plate. Second grooves 252 are circumferentially spaced apart from one another and positioned to oppose and cooperate with first grooves 250. A ball 256 is positioned within each corresponding pair of first and second grooves. Each of first and second grooves 250, 252 varies in depth in a circumferential direction such that a helically shaped ball contact surface 258 is formed. Each ball contact surface has a radial width to allow off-axis rotation of input shaft 232 and output shaft 224. Relative misalignment of the shafts is allowed while clutch 220 drivingly couples input shaft 232 to output shaft 224 due to balls 256 being free to radially translate within grooves 250, 252 during operation.

Figure 9:
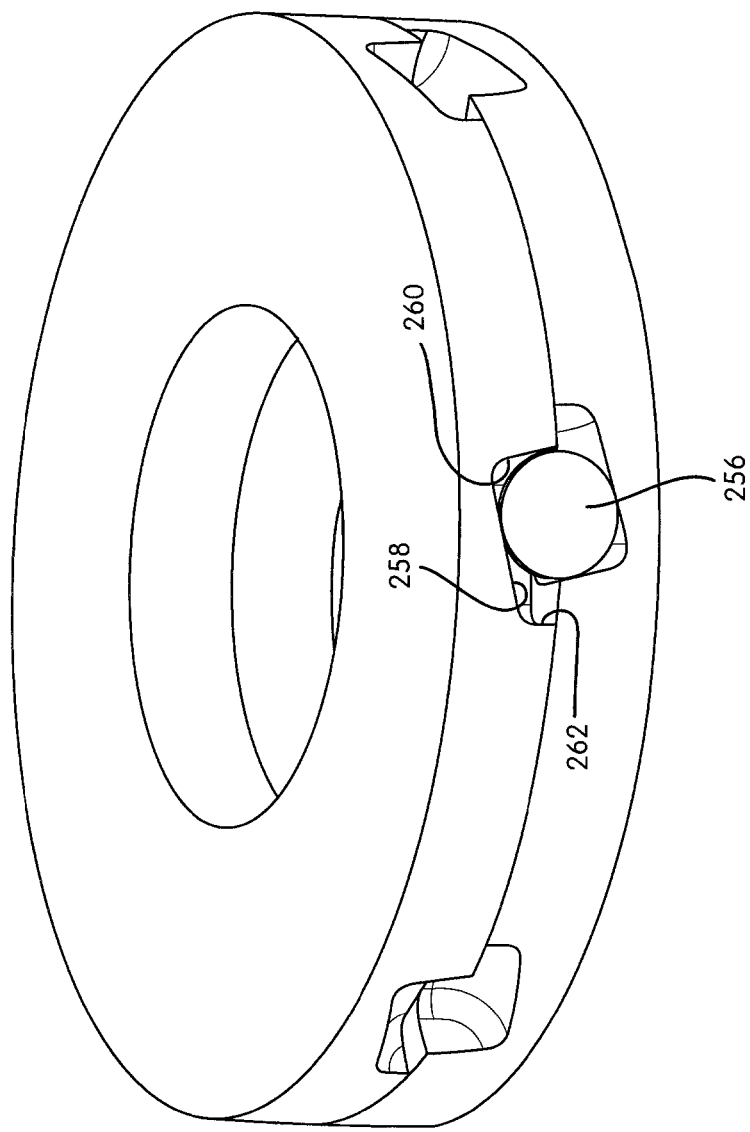
FIG. 9 is a fragmentary perspective view of a portion of a ball ramp mechanism.
Figure 10:
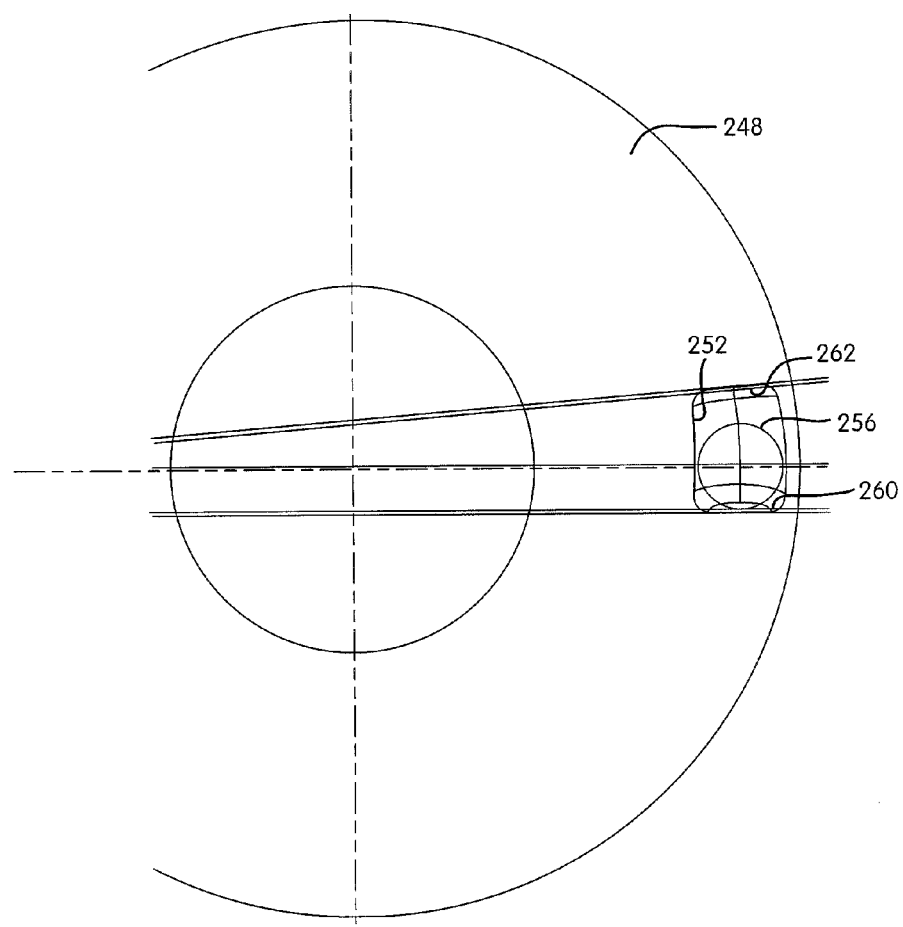
FIG. 10 is a plan view of a portion of the ball ramp mechanism shown in FIG. 8.
Figure 11:
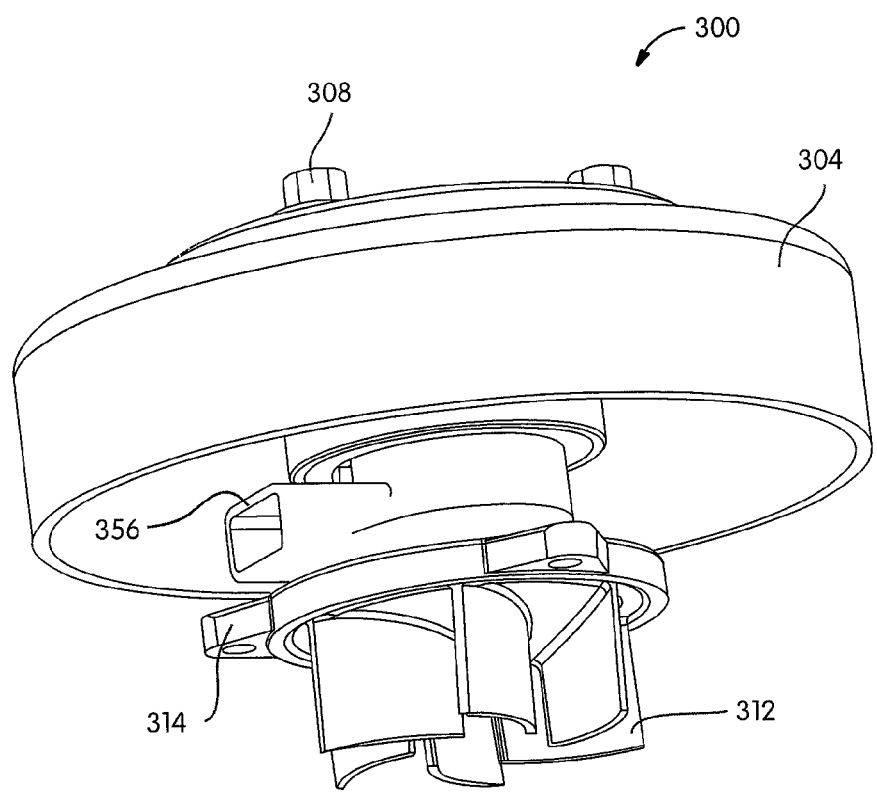
FIG. 11 is a perspective view of another electromagnetic clutch associated with another exemplary water pump.
Figure 12:
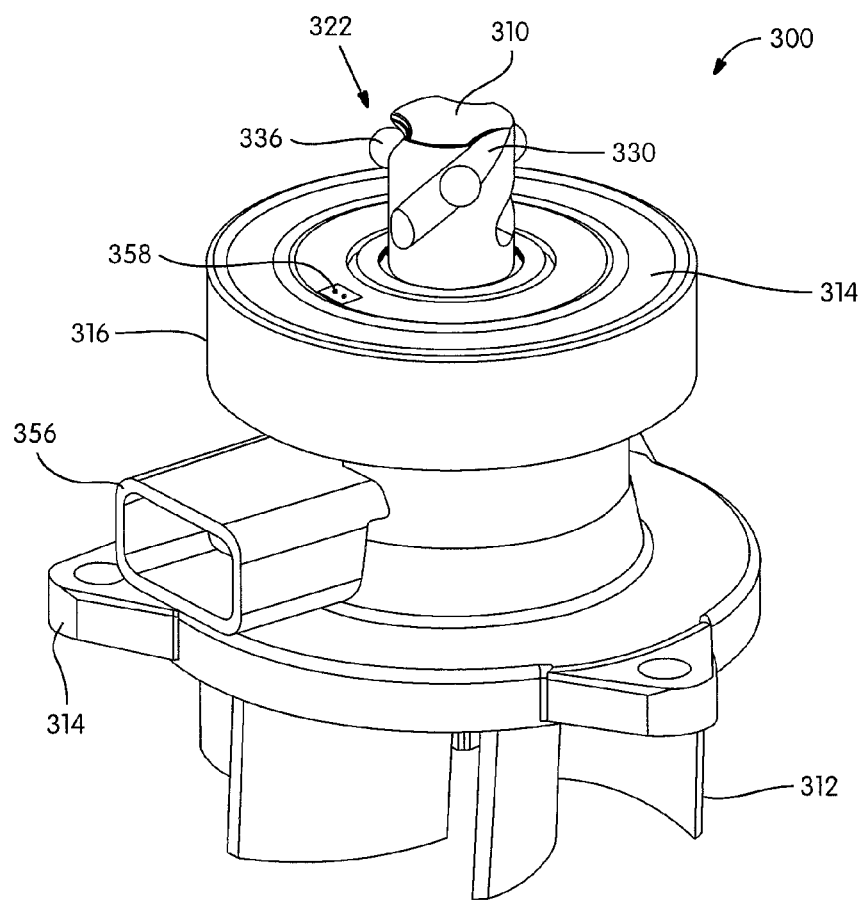
FIG. 12 is a partial perspective view of the clutch and pump assembly depicted in FIG. 11.
Figure 13:
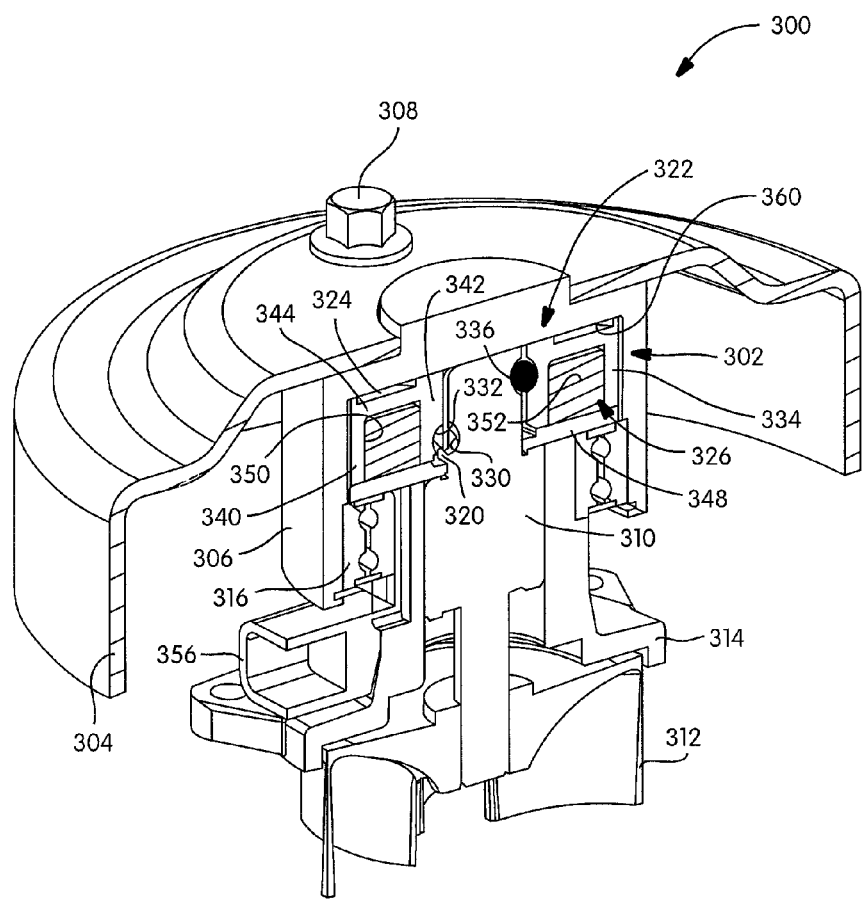
FIG. 13 is a fragmentary perspective view of the electromagnetic clutch and water pump assembly shown in FIGS. 11 and 12.

FIGS. 9 and 10 depict an alternate structure that may be used for any of the ball grooves previously described including grooves 250, 252. Each helical ball contact surface 258 is bounded by a first stop face 260 and a second stop face 262. First stop face 260 is positioned to assure that each ball 256 remains positioned on the helically shaped surfaces 258 of grooves 250, 252. Furthermore, the position of first stop faces 260 maintains a minimum spacing between planar end face 238 and planar surface 254. By maintaining a clearance between armature plate 248 and hub 236, residual magnetism will not be sufficient to maintain armature plate 248 in the disengaged or spaced apart position from friction pad 249 when it is desired to transfer torque across clutch 220. First stop face 260 extends at substantially 90 degrees to helical contact surface 258 such that ball 256 is restricted from going deeper into grooves 250, 252. It should also be appreciated that first stop face 260 extends parallel to a line intersecting a center of ball 256 and the axis of rotation of hub 236. This geometrical relationship allows radial movement of each ball 256 while not necessarily encouraging balls 256 to move toward a more shallow position within grooves 250, 252. Relative misalignment between input shaft 232 and output shaft 224 may be compensated without inadvertently engaging or disengaging the clutch.

Second stop face 262 may extend perpendicularly to contact surface 258 or face 238. It is contemplated that the length of helical contact surface 258 will be determined such that balls 256 will fail to reach second stop faces 262 during engagement of armature plate 248 with friction pad 249.

Ball ramp mechanism 242 also includes a plurality of circumferentially spaced apart springs 266. A plurality of axially protruding pegs 268 are integrally formed with armature plate 248. Each peg 268 includes a recess 270 in receipt of a portion of one of springs 266. A plurality of dogs 272 radially inwardly extend from an aperture 274 formed in hub 236. Each dog 272 includes an end face 276 placed in biased engagement with one of springs 266. Springs 266 load armature plate 248 to rotate relative to hub 236 in a direction urging balls 256 toward the shallow ends of grooves 250, 252. As balls 256 move toward the shallow ends of the grooves, armature plate 248 is axially translated toward friction pad 249.

Electromagnet 246 is coupled to a magnetic core 278 that is fixed to housing 222 either directly or via bearing 226. Electromagnet 246 is positioned and maintained in a spaced apart relation relative to input shaft 232. Electromagnet 246 includes a coil of wire 280 that is stationary and supplied electrical power via a cord 282. As previously described with relation to the prior clutch embodiments, when current flows through coil 280, a magnetic field is generated. Flux lines pass through armature plate 248 to draw the armature plate axially away from engagement with friction pad 249. Clutch 220 does not transfer torque between input shaft 232 and output shaft 224 at this time.

FIGS. 11-15 depict another pump 300 having an electromagnetic clutch 302. A pulley 304 is fixed to a hub 306 by a fastener 308. An output shaft 310 is fixed for rotation with an impeller 312. Electromagnetic clutch 302 is enclosed by hub 306 and positioned within a sealed environment. Hub 306 is supported for rotation on a housing 314 by a bearing 316. Clutch 302 includes an apply spring 320, a ball screw 322, a friction disk 324 and an electromagnet 326. Clutch 302 operates substantially similarly to clutches 10, 100 and 200 with the exception that the ball ramp mechanism is replaced with ball screw 322. Ball screw 322 includes a plurality of first ball grooves 330 formed on output shaft 310. A set of second ball grooves 332 are formed on an armature plate 334. A plurality of balls 336 are positioned within the space defined by first ball grooves 330 and second ball grooves 332. Rotation of output shaft 310 causes axial translation of armature plate 334.

Armature plate 334 includes an outer cylindrical wall 340 and an inner cylindrical wall 342 interconnected by an end wall 344. Friction disk 324 is fixed to end wall 344. A backing iron 348 engages both outer cylindrical wall 340 and inner cylindrical wall 342 and caps a cavity 350.

A wire coil 352 is positioned within cavity 350. An electrical connector 356 provides a conduit for electrical wires 358 to pass along an inner diameter of bearing 316 to provide power to coil 352. To provide a robust electrical connection, electrical connector 356 may be overmolded to protect wires 358 providing power supply to coil 352.

To operate clutch 302 in a non-torque transferring mode, current is passed through coil 352 to generate a magnetic field and draw friction disk 324 away from a clutch surface 360 formed on hub 306. To cause torque to be transferred from pulley 304 to impeller 312, electromagnet 326 is deenergized. Spring 320 urges armature plate 334 toward clutch surface 360. Through ball screw 322, friction disk 324 engages hub 306 with a relatively light load. Clutch self energization occurs when the impeller load restricts output shaft 310 from rotating while pulley 304 is being driven, the helix angle of ball screw 322 drives friction disk 324 toward clutch surface 360 at an increased force magnitude to increase the maximum quantity of torque transferrable by clutch 302. In one configuration, armature plate 334 rotates relative to output shaft 310 approximately two degrees to traverse a spacing of approximately 0.3 mm of gap between friction disk 324 and clutch surface 360.

Figure 14:
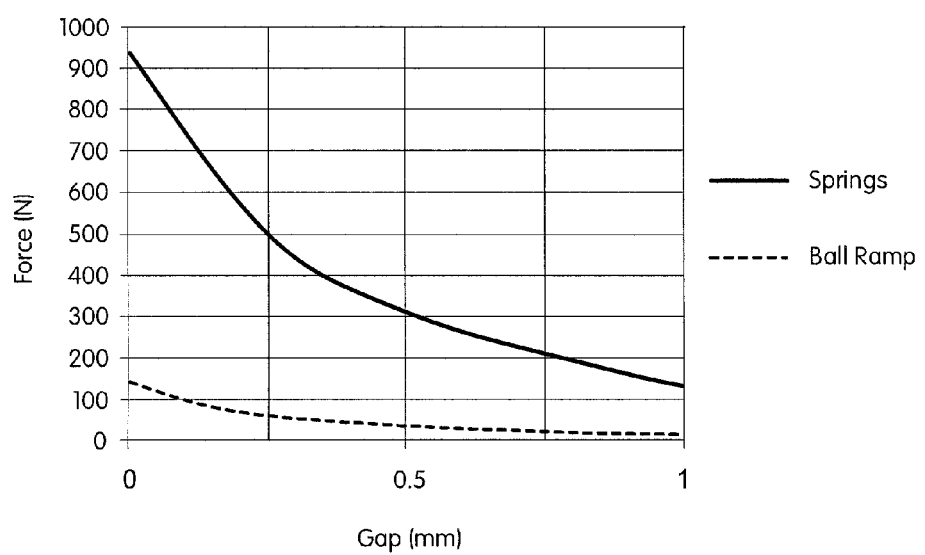
FIG. 14 is a graph depicting electromagnetic force per gap between friction plate clutch members.

As previously described, the force generated by electromagnet 326 may be substantially less than the force required by other electromagnets associated with clutches having the entire apply force provided by springs. FIG. 14 represents the force required from an electromagnet for the ball ramp design as compared to a design using springs.

Figure 15:
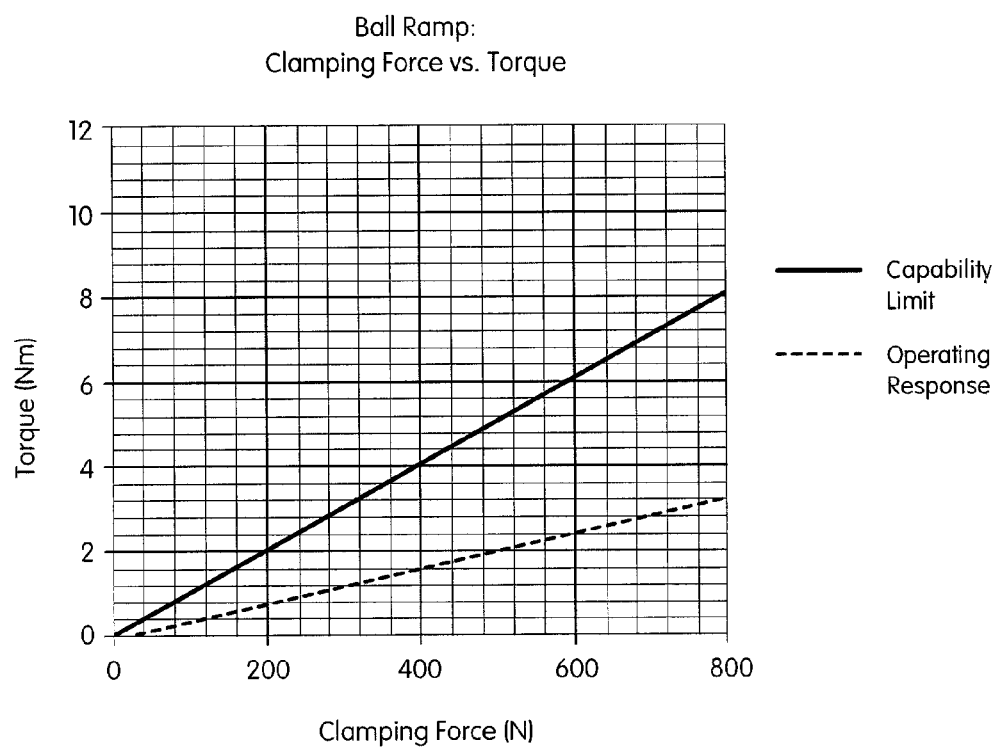
FIG. 15 is a graph depicting clamping force versus torque for a ball ramp actuator of an electromagnetic clutch.

FIG. 15 depicts clamping force versus torque for one of clutches 10, 100 or 200, including a ball ramp mechanism. The "Capability Limit" trace represents the maximum torque transferrable by the clutch. The trace identified as "Operating Response" represents the output characteristics of the same clutch having a ball ramp angle of approximately 35 degrees where the balls are positioned at a radius of 6 mm from the rotational axis. A spring force of 30 N is provided by the biasing member and a nominal gap between the plate members of the friction clutch is approximately 0.30 mm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromagnetic clutch comprising:
a rotatable input member;
a rotatable output member;
a clutch plate fixed for rotation with the output member;
an armature plate axially moveable relative to the input member; and
a self-energizing actuator for converting rotary motion of the input member to linear movement of the armature plate, wherein the actuator includes a biasing member interconnecting the input member and the armature plate, the biasing member urging relative rotation between the input member and the armature plate to initially engage the armature plate and the clutch plate, the self-energizing actuator providing an additional clutch engagement force once the input member is driven, the actuator also including an electromagnet to axially translate the armature plate and disengage the armature plate and the clutch plate.

2. The electromagnetic clutch of claim 1 wherein the actuator includes a ball ramp mechanism having a first cam plate, a second cam plate and a plurality of rolling members positioned therebetween.

3. The electromagnetic clutch of claim 2 wherein the first cam plate is fixed for rotation with the input member and the second cam plate is fixed to the armature plate.

4. The electromagnetic clutch of claim 3 wherein the input member includes a pulley portion at least partially encompassing the electromagnet.

5. An electromagnetic clutch comprising:
a rotatable input member;
a rotatable output member;
a clutch plate fixed for rotation with one of the input member and the output member;
an armature plate axially moveable relative to the other of the input member and the output member;
a self-energizing actuator for converting rotary motion of the input member to linear movement of the armature plate, wherein the actuator includes a biasing member urging relative rotation between the other of the input member and the output member and the armature plate to initially engage the armature plate and the clutch plate, the self-energizing actuator providing an additional clutch engagement force once the input member is driven, the actuator also including an electromagnet to axially translate the armature plate and disengage the armature plate and the clutch plate; and
wherein the input member includes a plurality of circumferentially spaced apart projections and the armature plate includes a plurality of slots in receipt of the projections, a spring being positioned within one of the slots and engaging one of the projections to urge relative rotation between the input member and the armature plate.

6. The electromagnetic clutch of claim 2 wherein the first cam plate includes a plurality of circumferentially spaced apart grooves having varying depths.

7. The electromagnetic clutch of claim 6 wherein the first cam plate includes a locking feature for fixing the input member for rotation thereto, the first cam plate being formed from a first material and including hardened grooves, the first input member being formed from a second material other than the first material.

8. The electromagnetic clutch of claim 1 wherein the actuator includes a ball screw mechanism including a first spiral groove, a second spiral groove and a rolling member therebetween.

9. The electromagnetic clutch of claim 8 wherein the first spiral groove is formed on the input member.

10. The electromagnetic clutch of claim 9 wherein the second spiral groove is formed on the armature plate.

11. The electromagnetic clutch of claim 8 wherein the input member includes a pulley and a hub separable from one another to provide access to a housing mounting provision.

12. The electromagnetic clutch of claim 11 wherein the hub is supported for rotation by the housing and a bearing, the hub encompassing the ball screw mechanism.

13. The electromagnetic clutch of claim 12 further including an overmolded electrical connector radially positioned between the bearing and the housing.

14. The electromagnetic clutch of claim 1 further including an impeller fixed for rotation with the output member.

15. A pump comprising:
a rotatable input member;
a rotatable output member fixed to a pumping member;
a clutch plate fixed for rotation with the output member;
an armature plate axially moveable relative to and being driven by the input member;
a biasing member interconnecting the input member and the armature plate;
an electromagnet to axially translate the armature plate and space apart the armature plate from the clutch plate; and
a ball ramp mechanism having a plurality of rolling members positioned between the clutch plate and the armature plate, the armature plate including a plurality of spaced apart circumferentially extending grooves having varying depths, each groove having a stop face positioned at one end and extending parallel to a line extending through a center of the rolling member and an axis of rotation of the armature plate when the rolling member contacts the stop face.

16. The pump of claim 15 wherein the biasing member urges relative rotation between the input member and the armature plate to engage the armature plate with the clutch plate.

17. A pump comprising:
a rotatable input member;
a rotatable output member fixed to a pumping member;
a clutch plate fixed for rotation with the output member;
an armature plate axially moveable relative to and being driven by the input member;
an electromagnet to axially translate the armature plate and space apart the armature plate from the clutch plate;
a ball ramp mechanism having a plurality of rolling members positioned between the clutch plate and the armature plate, the armature plate including a plurality of spaced apart circumferentially extending grooves having varying depths, each groove having a stop face positioned at one end and extending parallel to a line extending through a center of the rolling member and an axis of rotation of the armature plate when the rolling member contacts the stop face;
a biasing member urging relative rotation between the input member and the armature plate to engage the armature plate with the clutch plate; and
further including a housing rotatably supporting each of the input and output members, the output member having a first end fixed to the clutch plate and a second end fixed to the pumping member.

18. The pump of claim 17 wherein the input member surrounds a portion of the output member.

19. The pump of claim 18 wherein the input member surrounds the electromagnet.

20. The pump of claim 18 wherein the input member includes external teeth.

21. The pump of claim 15 wherein the grooves include a width to allow a magnitude of rolling member radial movement such that the input member may rotate at a different speed than the output member when the armature plate is fixed for rotation with the clutch plate.

22. The electromagnetic clutch of claim 1 wherein the input shaft includes a plurality of first grooves, the armature plate includes a plurality of second grooves each disposed opposite one of the first grooves, each of the first and second grooves having a deepest portion and shallow ends; and further including a plurality of balls each positioned within a space between an opposing pair of the grooves.

23. The electromagnetic clutch of claim 22 wherein each of the grooves varies in depth in a circumferential direction and forms a helically shaped ball contact surface.

24. An electromagnetic clutch comprising:
an output shaft including a plurality of first ball grooves;
an armature plate including an inner cylindrical wall disposed about the output shaft and an outer cylindrical wall spaced from and interconnected to the inner cylindrical wall by an end wall;
the inner cylindrical wall of the armature plate including a plurality of second ball grooves each disposed opposite one of the first ball grooves;
a plurality of balls each positioned within a space between the opposing first and second ball grooves;
a backing iron extending from the output shaft to the outer cylindrical wall and the inner cylindrical wall of the armature plate;
an electromagnet disposed between the backing iron and the walls of the armature plate; and
a friction disk fixed to the end wall of the armature plate.

25. The electromagnetic clutch of claim 24 including an apply spring disposed between the output shaft and the inner cylindrical wall of the armature plate for urging the armature plate and the friction disk toward the clutch surface.

* * * * *